INVENTOR.
GLEN E. MILLER
BY
Reynolds & Christensen
ATTORNEYS

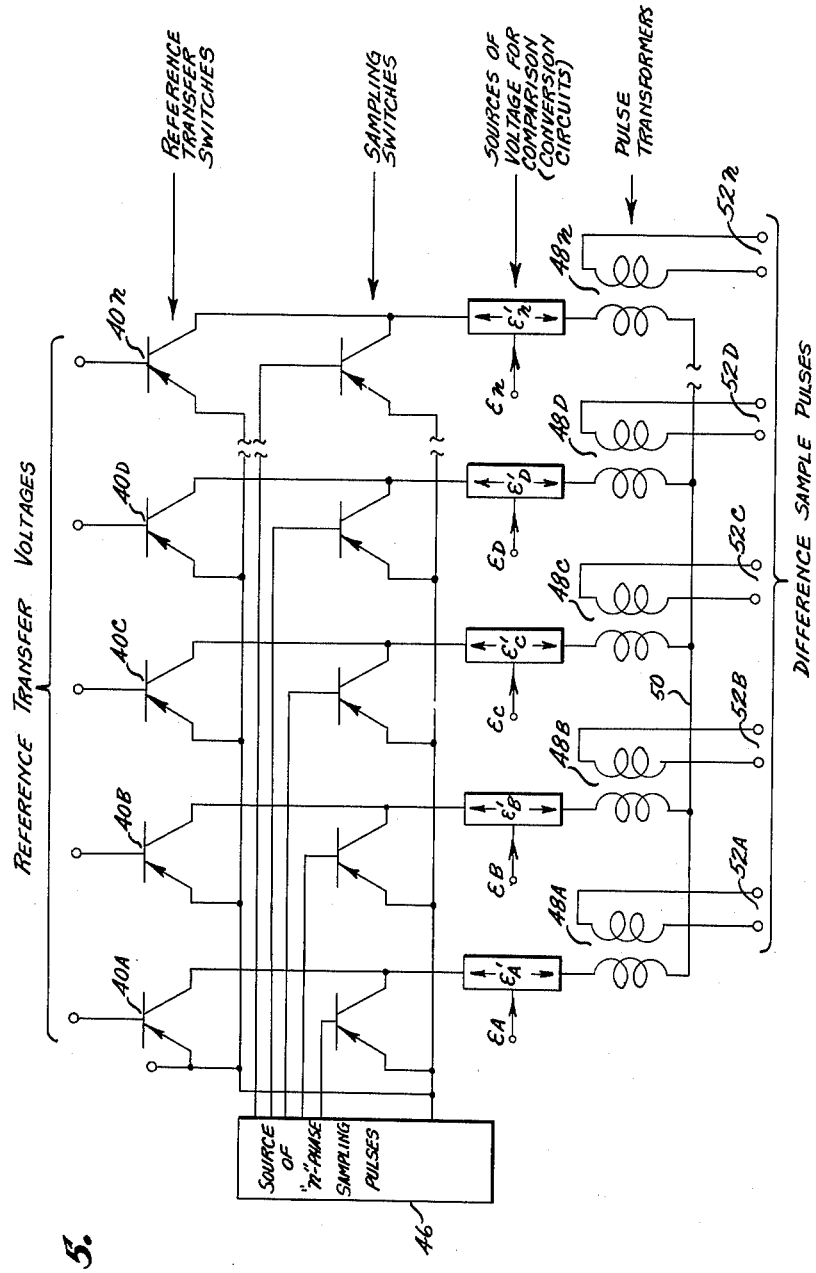

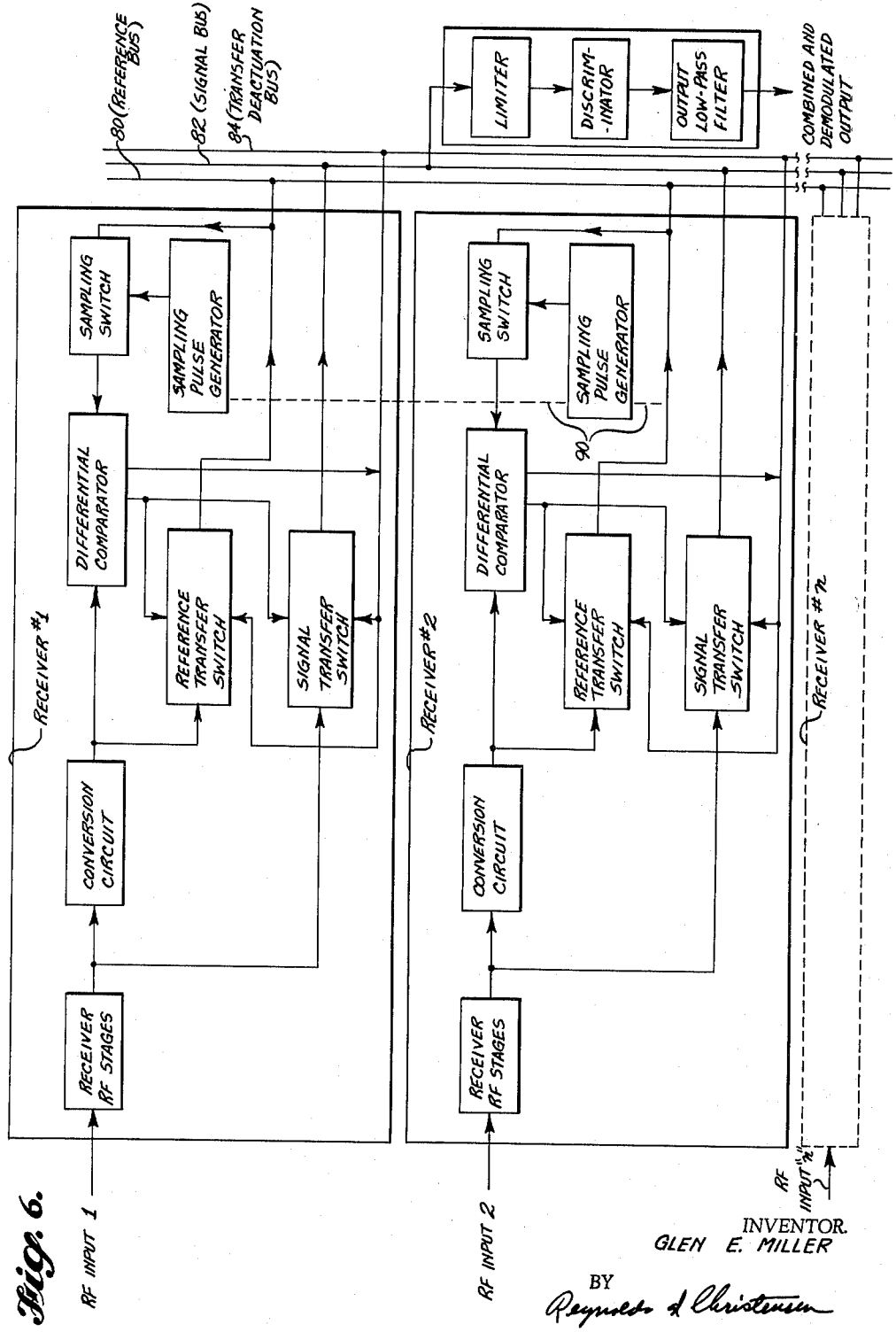

3,206,679
DIVERSITY COMBINING SYSTEM EMPLOYING DIFFERENTIAL SAMPLING
Glen E. Miller, Kent, Wash., assignor to The Boeing Company, Seattle, Wash., a corporation of Delaware
Filed Jan. 10, 1963, Ser. No. 250,634
8 Claims. (Cl. 325—304)

This invention relates to improvements in diversity combining circuits such as may be used to select from time to time that communication channel or signal from among a plurality of such channels or signals which most nearly satisfies a certain requirement or set of requirements. For example, in a radio system having a plurality of communication channels all of which simultaneously convey the same information or signal (individually varied by diverse transmission and/or reception conditions), the diversity combining apparatus of this invention may be used as a means of selecting from time to time that channel which conveys the strongest signal, or has the best signal-to-noise ratio, or in some other way best satisfies certain reference conditions. The purpose in that event is to produce output information with the highest attainable degree of reliability and continuity. The invention is herein illustratively described by reference to its application to a frequency-modulation diversity receiver having a plurality of carrier channels and a single demodulator or output circuit energized at any instant by the particular channel whose signal condition is then comparatively best; however, it will be recognized that certain modifications and changes therein may be made with respect to details and certain other applications of the invention may be practiced without departing from the essential features involved.

The concept of diversity communication as a means to achieve reliable reception continuity in radio systems and the like is, of course, well known. In the case of radio wave systems, for example, diversity may be based on conditions of space, polarization, frequency and/or time. It is assumed that fading, noise interference, polarization effects, frequency shifts or space nulls can be largely eliminated as disturbing influences on continuity and reliability of reception by employing a plurality of channels each influenced differently in point of time by these variables, and by continuously selecting the channel least adversely affected by the variables at any given instant. In case of highly critical importance attached to signal continuity under adverse transmission conditions there may be a large number of separate carrier channels operated in diversity relationship, in order to insure that there will always be at least one channel having a satisfactory signal. In some instances, the output signal may be derived from one channel exclusively, all others being then rejected; and in other instances the output signal may represent a combination of more than one input signal. The first type of system is referred to as an "exclusive" combiner, whereas the second type is referred to as a "proportional" combiner. In either instance, a selection function is required upon the basis of which one channel is given predominant importance (either exclusive or proportional) at a given instant of time because that channel most nearly meets the reference criteria. Combination in any case may be accomplished at various points in the receiving system. It may be accomplished prior to demodulation at the R-F or I-F level, or it may be effected after demodulation at the "base-band" level.

One of the most common methods of diversity combination in receiving systems operates at the base-band level, with the individual signals being summated in proportion to the square of their respective signal-to-noise ratio of the combined output in order to achieve an output signal-to-noise ratio greater than that of any one of the contributing inputs. This technique suffers the limitation that the combiner output amplitude varies as a function of the ratio of individual signal-to-noise ratios. This defect can be partially overcome by employing a compressor-expander circuit. However, such a circuit introduces an added time constant in the system permitting it to accommodate only slow amplitude variations. Another common method of base-band combination involves the selection of one of several base-band signals to the exclusion of all others, but this usually entails problems with transients occurring in the output signal as a result of switching from one channel to another. These transients arise from the fact that this base-band amplifiers will not always have equal gain or there will be drift in the slope of the individual discriminator characteristics. Moreover, direct current unbalance of the switching gates or the base-band amplifiers, or slight differences or changes in discriminator center frequencies, will usually result in abrupt direct-current shifts at the time of channel switching. Further, deficiencies of prior base-band type systems become important also in AM communication systems of the type where precise data amplitude fidelity is necessity, such as where amplitude itself represents data value.

An object of the present invention is to devise an effective and practicable diversity combining system operating at a predetection stage in the receiver circuits and thereby eliminating the usual causes of switching and amplitude variation problems. This technique of predetection diversity combination involves exclusive switching (i.e., selection of only a single channel at a given instant of time) inasmuch as phasing problems arise when proportional summing is attempted using a single discriminator, low-pass filter and base-band amplifier to which the different diversity reception channels may be selectively connected.

Heretofore, diversity combiners were normally suitable for use with a given number of receivers only, and were inoperable with a fewer or greater number. Another object of this invention is to provide a diversity combiner capable of operating by itself with a given receiver system or of operating in cooperation with any number of other receivers without need for elaborate or complex combining units.

Another object is to devise such a diversity combiner wherein the output signal amplitude or other characteristic remains substantially constant despite variations in individual signal characteristics provided at least one of the plurality of channels carries a signal having the desired characteristic above a certain "improvement threshold" value at which the demodulator operates.

A related object is to devise a system of this nature in which transients in the output due to channel switching are virtually eliminated.

In a system in which signal-to-noise ratio is the criterion, it is an object hereof to devise a diversity combiner in which the output signal-to-noise ratio is at least as good as that of the best individual channel at all times.

A further object is to devise a channel selector in a diversity combiner wherein the selection is decisive and positive and wherein a given selection is continuously retained as long as the channel so selected remains best. The improved system assures against vacillation or fluctuation back and forth between channels of approximately equal signal quality by selecting a given one of two such channels and by changing to another channel only if it is or becomes better than the channel then selected by more than a certain degree of improvement.

As disclosed herein the invention resides in combining apparatus wherein a signal transfer switch selectively applies the signal in one channel to the receiver demodulator or other utilization device, under control of a comparator system which substantially continuously monitors and compares a predetermined reference condition of the selected channel signal with those of remaining channels and which effects a transfer to different signals only as they each become sufficiently improved over the selected signal. The comparator system in turn embodies conversion circuits by which the signal reference condition of each channel is converted into a reference signal, and further embodies indivdiual reference signal comparators and a reference transfer switch by which the reference signal of the selected channel is compared, preferably in recurring sequence, with those of the remaining channels. Both the reference transfer switch and the signal transfer switch are operable to transfer to a different channel in response to a change of comparative reference conditions more favorable to the latter as detected by the comparators.

These and other features, objects and advantages of the invention will become more fully evident from the following description thereof by reference to the accompanying drawings.

FIGURE 5 is a schematic of a transistorized $n$-channel differential comparator system similar to that in FIGURE 2.

FIGURE 6 is a block diagram of a composite diversity reception system illustrating application of the invention to a plurality of conventional receiver units.

Figure 1:
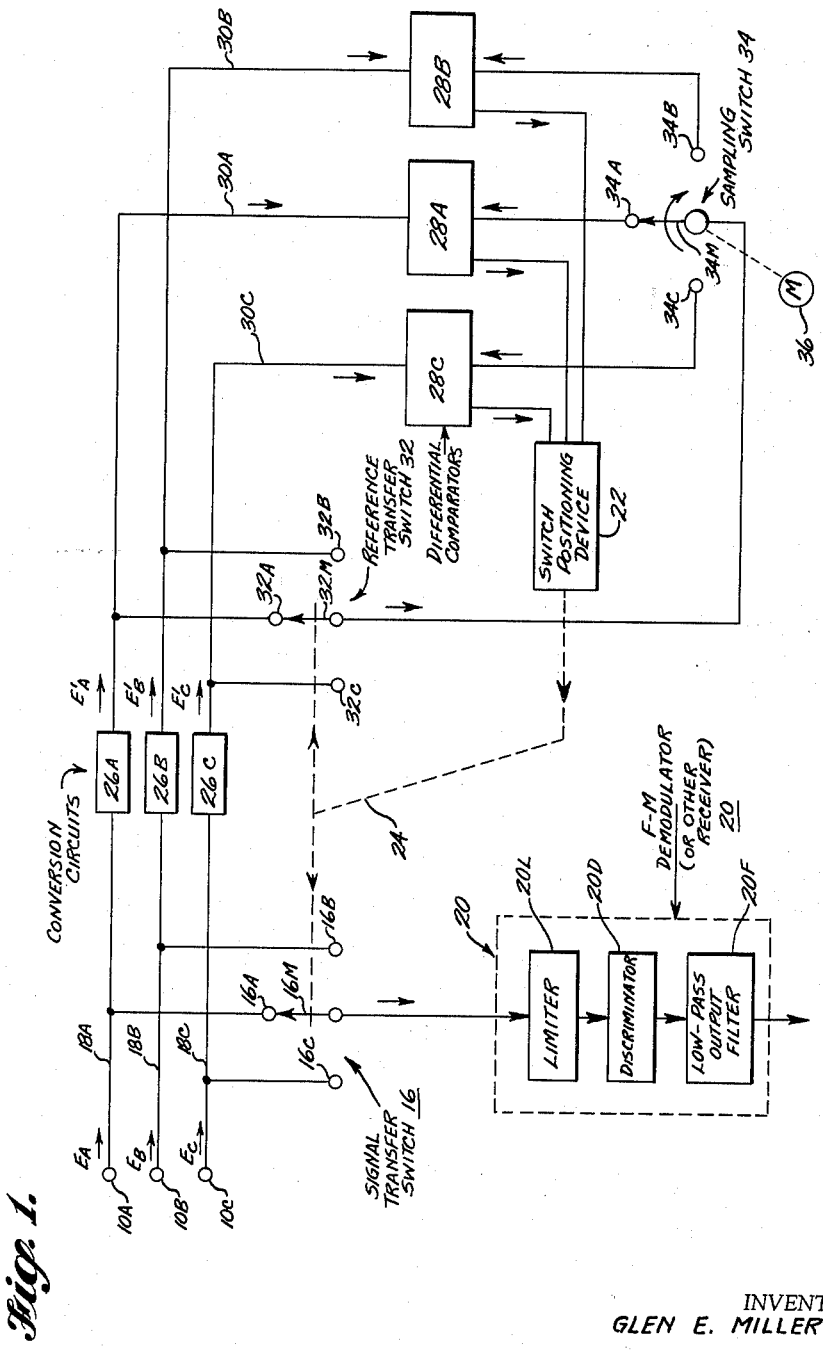
FIGURE 1 is a block diagram of a three-channel diversity FM receiver system embodying the invention.

Referring to FIGURE 1, frequency-modulation carrier signals $E_A$, $E_B$ and $E_C$ enter the system at terminals 10A, 10B and 10C. A signal transfer switch 16, having stationary contacts 16A, 16B and 16C connected to the respective channel conductors 18A, 18B and 18C, has a movable contact 16M connected to the input of FM demodulator 20 and selectively engageable with the stationary contacts. Shown in a mechanical form, switch 16 may be, and in most practical applications usually will comprise an electronic gating circuit. Positioning of switch contactor 16M, as later explained, is under control of switch positioning device 22, as indicated by the dotted-line connection 24. The illustrated demodulator 20 comprises the usual limiter 20L, discriminator 20D and low-pass output filter 20F.

A selected one of the FM carrier signals $E_A$, $E_B$ and $E_C$ is thus selectively transferred to the demodulator input by proper positioning of switch 16. The choice of carrier signal thus made is determined by the desired quality or reference condition by which the system gauges the comparative degree of suitability of the carrier signals. In order to determine comparative suitability, each carrier signal is first converted into a reference signal representing a measure of the reference condition upon which the selection is to be based. Conversion circuits 26A, 26B and 26C derive the respective reference signals $E_A'$, $E_B'$, and $E_C'$ and present the same to the primary inputs of operatively associated differential comparators 28A, 28B and 28C by way of the respective conductors 30A, 30B and 30C. For example, the reference signals may represent merely the detected amplitudes (i.e., D.-C. voltages) of the associated channel signals. Alternatively they may represent a proportional relationship to channel noise level outside the modulation pass-band, signal-to-noise ratio, or any other desired condition or quality of the channel signals.

The derived reference signals $E_A'$, $E_B'$ and $E_C'$ are also applied to stationary contacts 32A, 32B and 32C of reference transfer switch 32. The moving contact 32M of this switch is connected electrically to the moving contact 34M of sampling switch 34 and is, along with switch 16, positionally controlled by the device 22. The stationary contacts 34A, 34B and 34C of sampling switch 34 are connected to the respective secondary inputs of differential comparators 28A, 28B and 28C. Moving contactor 34M is continuously driven, as by motor 36, to engage its stationary contacts in recurrent succession. Consequently the secondary inputs of the differential comparators recurringly receive samplings of the reference condition signal ($E_A'$, $E_B'$ or $E_C'$) currently selected by switch 32, whereas the primary inputs of these comparators continuously receive the respective reference condition signals of the channels to which they are connected. The comparators are thereby enabled to compare the reference signals of all remaining channels substantially continuously with that of the selected channel to which the demodulator is currently connected. Like switch 16, switches 32 and 34 also are shown in a mechanical form but in practice may comprise electronic gating or switching circuits.

Differential comparators 28A, 28B and 28C have outputs coupled to switch positioning device 22 and which are capable of energizing the latter in order to shift the position of switches 16 and 32 in response to a predetermined improvement of an unselected channel over the currently selected channel. Until such an improvement occurs, the switches are retained in their previously selected settings. Mere attainment of signal equality of an unselected channel with the selected channel will not operate these switches. Moreover, because of the sequential action of sampling switch 34, should two unselected channel signals both simultaneously become improved sufficiently over the selected channel signal to effect operation of positioning device 22 a definite one of these two will be selected decisively, namely the one first reached by the sampling switch in its operating sequence. Due to these relationships the system is highly stable, minimizes the number of changes of channel, avoids vacillation in its selections and institutes immediate and definitely ordered changes whenever signal improvement in the demodulator can be realized. Because the switching action occurs at a point in the receiving system ahead of the demodulator switching transients are minimized, as previously stated. Moreover, the substantially continuous comparative monitoring of signal conditions is effected without interfering in any way with normal receiver circuit operation.

In practice each differential comparator 28 produces an output which is proportional to the algebraic difference of its two inputs. The switch positioning device 22 thereby receives in its respective inputs unipolar impulses of either polarity occurring in periodic sequential manner. Whenever one of these applied impulses of a particular polarity attains a given magnitude it will cause operation of signal transfer switch 16 and reference transfer switch 32 in order to effect a transfer to the particular channel producing such a signal. This requirement that the impulse be of a predetermined minimum magnitude before it will operate the switch positioning device introduces a degree of hysteresis in the system contributing to stability of the system as mentioned above. An unselected channel signal must become better than the selected channel signal by more than a given amount before it will be substituted for the latter. The smaller this required signal improvement differential the more tense or sensitive will the system become, and the more frequent will be the switching action.

Use of sequential reference signal sampling by switch 34 in operation of the comparators 28 not only eliminates the confusion which can arise in attempting to select between two channels equally better than the previously selected channel, but it greatly simplifies the design of reliable comparators and switching circuits.

Figure 2:
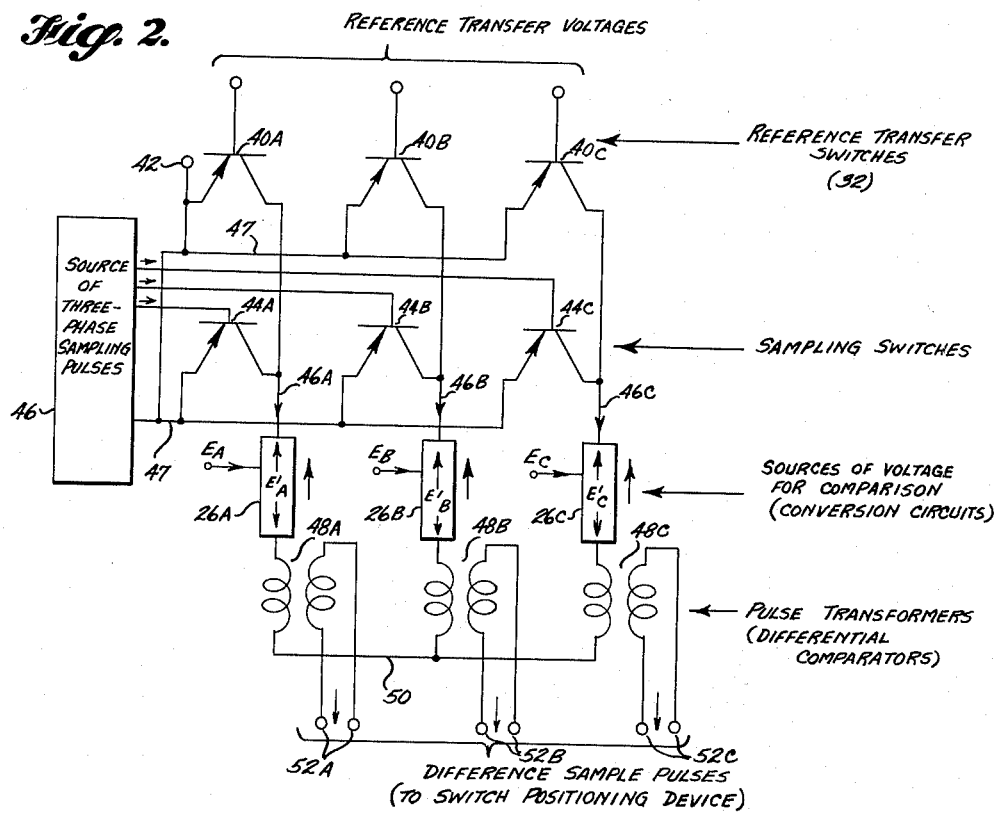
FIGURE 2 is a schematic of a transistorized three-channel diversity FM receiver system embodying the invention.

In FIGURE 2 transistors 40A, 40B and 40C serve as reference transfer switches (equivalent to switch 32 in FIGURE 1). Reference transfer voltage applied to the base of any such transistor clamps its collector to common conductor 47 held at a suitable bias potential derived from a source (not shown) connected to terminal 42. The bank of transistors 44A, 44B and 44C serve as sampling switches and have collectors connected to the collectors of the respectively associated transistors 40A, 40B and 40C. The collectors of transistors 44 are also subject to being clamped to common conductor 47, in this instance by application of recurring sampling pulses to their respective bases from the three-phase sampling pulse source 46. Thus, the respective channel collector conductors 46A, 46B and 46C normally isolated circuitwise from each other are subject to becoming effectively interconnected if simultaneously clamped to common conductor 47. While channel A, for example, is selected by the system, conductor 46A is clamped to conductor 47 by switch 40A. During that time conductors 46B and 46C are clamped to conductor 47 in successive recurrent manner by switches 44B and 44C respectively.

The respective channel conversion circuits 26A, 26B and 26C are connected serially with the primaries of pulse transformers 48A, 48B and 48C, between the respective conductors 46A, 46B and 46C and a common junction represented by conductor 50. Now during clamping action by switch 40A accompanying selection of channel A, for example, momentary clamping by switch 44B connects the voltage from conversion circuit 26A in bucking relationship to that of conversion circuit 26B. Depending upon which voltage is the greater there will be a positive pulse in the primary of one of the transformers 48A and 48B and a negative pulse in that of the other. Likewise when switch 44C momentarily clamps, there will be a positive pulse in the primary of one of the transformers 48A and 48C and a negative pulse in that of the other. The resultant differential sample pulses produced at the sets of output terminals 52A, 52B and 52C are adapted for application to the switch positioning device, which is capable of ignoring or rejecting all except a pulse of particular polarity and greater than a given threshold magnitude. The transformers and circuit polarities are so arranged relatively that such pulse will result in response to an unselected channel reference signal being greater than the reference signal of the previously selected channel.

Figure 3:
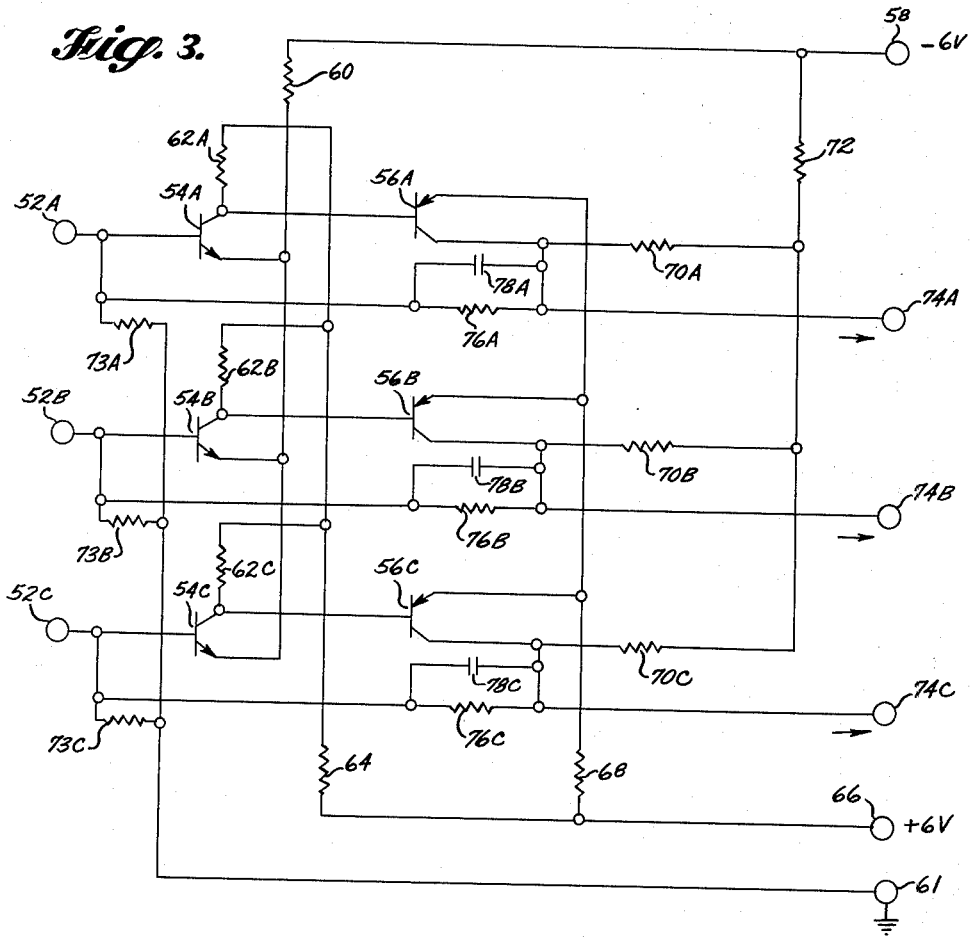
FIGURE 3 is a schematic of a transistorized three-channel tristable circuit designed to function as the reference transfer switch means of FIGURE 1.

These pulses of positive or negative polarity are amplified if necessary and are applied to the terminals 52A, 52B and 52C in the tristable reference transfer switch circuit of FIGURE 3. Transistors 54A, 54B and 54C have bases connected to these input terminals and collectors connected to the bases of associated transistors 56A, 56B and 56C. The emitters of transistors 54 are returned to a terminal 58 of negative potential through a common load resistor 60, whereas the collectors are returned through individual load resistors 62A, 62B and 62C and a common load resistor 64 to a terminal 66 of positive potential. The emitters of transistors 56 are connected through a common load resistor 68 to the terminal 66 whereas their collectors are connected through individual load resistors 70A, 70B and 70C and a common load resistor 72 to terminal 58. The bases of transistors 54A, 54B and 54C are returned to ground terminal 61 through individual load resistors 73A, 73B and 73C. The switch circuit output terminals are designated 74A, 74B and 74C and are connected directly to the respective collectors of transistors 56A, 56B and 56C, which in turn are coupled through resistances 76A, 76B and 76C, respectively by-passed by condensers 78A, 78B and 78C, to the bases of transistors 54A, 54B and 54C.

The associated transistors 54 and 56 of each channel form a bistable trigger circuit coupled to the other two such circuits such that a drive pulse of proper polarity and magnitude applied to the circuit of an unselected channel will reverse the operating condition of the bistable circuit of the previously selected channel. The values of resistors 72, 62 and 68 are only a small fraction those of resistors 64 and 70 which, in turn, are but a small fraction those of the remaining resistors. In a representative case resistors 68 and 72 were 330 ohms, resistors 62A were 680 ohms, resistors 70 were 1.8K ohms, resistor 64 was 2.7K ohms, resistors 76 were 33K ohms, and resistors 73 were 22K ohms. Resistor 60 was 1.2K ohms and transistors 54 were of the 2N1302 type while transistors 56 were of the 2N1303 type. Condensers 78 were 150 pf.

By operation of this circuit (FIGURE 3) switching from one channel to a different channel in the system is effected by reversing polarities of the D.-C. output voltage appearing at two of the three output terminals 74A, 74B and 74C. Such polarity reversals are effected by application of a positive pulse of predetermined minimum magnitude to the input terminal 52A, 52B or 52C which corresponds with the channel to be selected by the circuit. Thus, if channel A had previously been selected and the signal in channel B becomes improved over channel A to a predetermined extent, a positive pulse of sufficient polarity is applied by the circuit of FIGURE 2 to terminal 52B to reverse the state of the bistable transistor circuit 54B, 56B and change the polarity of the voltage at output terminal 74B from negative to positive. At the same time feedback from this bistable circuit to that (54A, 56A) of channel A reverses the state of the latter so as to change the voltage at output terminal 74A from positive to negative. Such triggering action initiated by the applied impulse at terminal 52B in this example is repeatable thereafter with channels A and C, but only if their signal condition becomes sufficiently improved compared with that of channel B to produce the necessary positive output pulse from the comparator circuit (FIGURE 2). Details of operation of the group of trigger circuits in FIGURE 3 will be evident to those skilled in the art without tracing the transient effects through the various circuit leads. Suffice it to say that the inputs 52A, 52B and 52C are normally held negative in relation to ground potential and to the emitters of transistors 54A, 54B and 54C. When a positive impulse of sufficient magnitude is incident on the transistor base overcoming the normal bias potential, the sudden positive transient reduces collector current and is coupled through associated condenser 78 to the collector of associated transistor 56A. The latter feeds back a positive potential increase to the collector of the transistor 54 and thereby further increases the base potential of the latter. The resultant feedback loop action is cumulative and drives the base of the selected transistor 54 to the saturation point of the transistor, where it remains until reversed by another transistor 54 being positively triggered. This trigger action simultaneously reverses the state of the last previously selected trigger circuit by reason of the coupling which exists between trigger circuit pairs of transistors through common emitter load resistors, especially 60 and 68.

Figure 4:
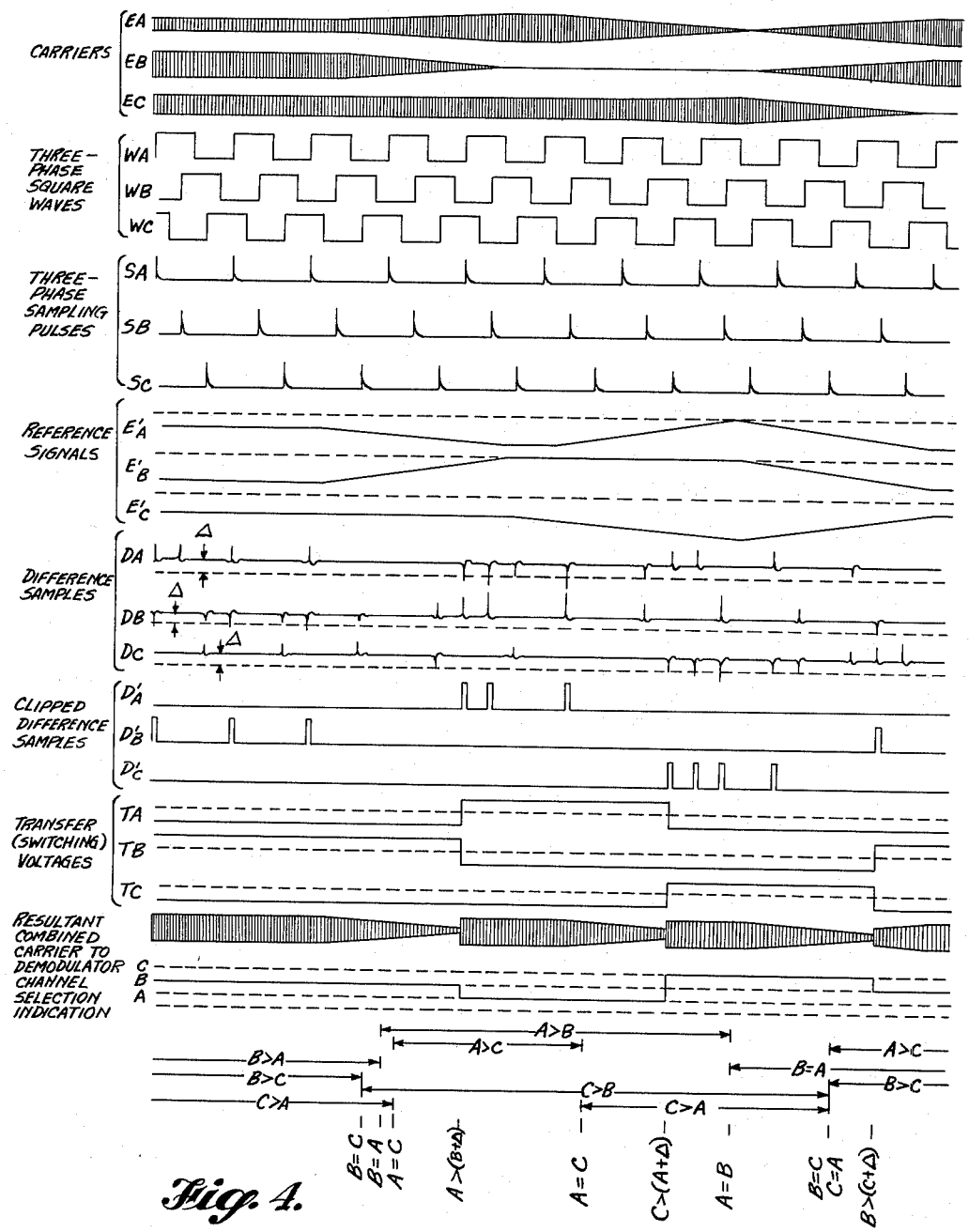
FIGURE 4 is a wave diagram illustrating the mode of operation of the system in FIGURE 1.

In FIGURE 4 the first three graphs depict representative modulated carrier signals as they may appear in channels $E_A$, $E_B$ and $E_C$. Graphs $W_A$, $W_B$ and $W_C$ represent three-phase square waves and graphs $S_A$, $S_B$ and $S_C$ represent three-phase sampling pulses derived from these waves in conventional manner for delivery by unit 46 in FIGURE 2. These detected carriers, as they may appear in the form of D.-C. voltages at the outputs of conversion circuits 26A, 26B and 26C, appear as $E_A'$, $E_B'$ and $E_C'$ in the succeeding three diagrams, serving as reference signals in the system. Difference sample pulses as they appear at the respective outputs of the pulse transformers in FIGURE 2 are designated $D_A$, $D_B$, $D_C$ in the ensuing three graphs. As will be seen, these occur in synchronism with sampling pulses, and, in the example, are positive when their respectively associated channel carrier exceeds the other two channel carriers; otherwise they are negative. Only the positive-going sample pulses are utilized by the reference transfer switching means (FIGURE 3). In graphs $D_A'$, $D_B'$ and $D_C'$ there appear positive pulses produced from only the negative difference sample pulses which exceed the critical threshold magnitude and which have then been amplified and inverted. These are applied to effect the transfer switching functions as depicted by the direct voltage waves appearing in graphs $T_A$, $T_B$ and $T_C$. The "combined" carrier as applied to the receiver demodulator appears in the next graph as the result of the selective channel switching. Channel selection indication is depicted symbolically in the graph bearing that designation, whereas the conditions of relative carrier signal values producing the action depicted in the overlying graphs are depicted at the bottom of the figure. The symbol "Δ" used in these notations represents the signal difference increment or degree of improvement necessary to effect a change of channels.

FIGURE 5 is intended to show, by expansion of the number of channels used in the differential comparator portion of the system, that the system of this invention may be used with any number ("$n$") of communication channels. Parts corresponding to those shown in FIGURE 2 bear similar reference numerals. It will be recognized that other portions of the total system are adopted for expansion in like manner to suit the number of channels used. Thus, instead of the tristable circuit in FIGURE 3 and "$n$"-stable circuit would be employed for the reference transfer switching means.

In FIGURE 6 there is shown a composite receiver system in which the "combiner" is split in effect so as to produce a receiver unit capable of operating by itself or in diversity with any number of like receivers without need for separate or additional diversity combining units. Each such receiver unit (numbered 1 through "$n$") contains within it a single conversion circuit, differential comparator, sampling switch, reference transfer switch, signal transfer switch and sampling pulse generator. The receiver units are linked together by means of three common buses 80, 82 and 84. Bus 82 is the signal bus to which the signal from the receiver currently in use is applied. Bus 80 is the reference bus to which the conversion circuit output from the channel receiver unit currently selected is applied. Bus 84 is the switching bus and is supplied by the channel receiver unit currently in use with a voltage which opens the signal and reference transfer switches in all other receivers.

If desired, the sampling pulse generators may also be coordinated for sequential sampling in the series of receivers by causing each to trigger the next sequentially in a ring oscillator arrangement. This is suggested by the dotted-line connection 90 shown in FIGURE 6.

Such a system is highly versatile in that it will accept any number of receivers without special combiners. Each receiver added to the system adds its necessary contribution to the combiner portion of the system. By the same token system reliability is enhanced in that failure of an individual receiver does not disable the system but merely precludes that receiver channel from being selected by the combiner. This also permits removal of receiver units for maintenance or replacement without interrupting system operation.

The invention has been illustrated and described in a representative embodiment. The novel concepts thereof apply in other embodiments and in other applications, however, and are thus defined in the accompanying claims without intending necessarily to limit the same to the illustrative cases.

I claim as my invention.

1. Diversity combining apparatus, comprising a plurality of diversity channels adapted for simultaneously transmission of individual channel signals comprising diverse variants of the same basic signal, utilization circuit means having an input, signal transfer switch means connected between said input and said channels and operable to transfer signals from individual channels selectively to said input, and control means operatively connected to said switch means for controlling said channel selection according to the comparative values of a predetermined reference condition in the respective signals, said control means including conversion circuit means deriving from the respective channels reference signals representing the respective reference condition values, comparator circuit means having primary inputs responsively connected to the conversion circuit means and secondary input connections including reference transfer switch means operable to select and periodically apply one such channel reference signal to said comparator circuit means for comparison with reference signals in said primary inputs, and means responsively connected to said comparison circuit means and for operating said signal transfer switch means and said reference transfer switch means to transfer the same to a different channel when the latter's reference signal differs in a predetermined degree from that of the channel previously selected.

2. The diversity combining apparatus defined in claim 1, wherein the secondary input connections further include sampling switch means operatively associated with the reference transfer switch means and operable to apply the selected channel reference signal in recurring sequential manner to the respective comparison circuit means.

3. The diversity combining apparatus defined in claim 2, wherein the signal transfer switch means is operable to select a single signal to the exclusion of all others at a given instant for application to the utilization circuit input.

4. Diversity combining communication apparatus, comprising a plurality of receiving channels, a receiver circuit having an input, signal transfer switch means connected between said input and said channels and operable to transfer signals from individual channels selectively to said input, and control means operatively connected to said switch means for controlling said channel selection according to the comparative values of a predetermined reference condition in the respective signals, said control means including conversion circuit means deriving from the respective channels reference signals representing the respective reference condition values, comparator circuit means, circuit means including sampling switch means and reference transfer switch means coupling said comparator circuit means with said conversion circuit means for causing sequential comparison by said comparator means of each of said reference signals with a selected one of said reference signals determined by the condition of said reference transfer switch means, and means responsively connected to said comparison circuit means and for operating said signal transfer switch means and said reference transfer switch means to transfer the signal to a different channel when the latter's reference signal differs in a predetermined degree from that of the channel previously selected.

5. The method of operating a diversity combiner for selecting therein from among a plurality of diversity signal channels that with a signal having a predetermined reference condition differing by more than a predetermined amount from the similar reference conditions of the other channel signals, said method comprising the steps of deriving reference signals representing the respective values of said channel signal reference conditions, selecting one such channel while substantially simultaneously selecting and comparing sequentially the reference signal of the selected channel with the respective reference signals of remaining channels, and changing the selection to a different channel and its reference signal responsively to attainment by the latter of a predetermined differential with relation to the reference signal of the channel previously selected.

6. The method of operating a diversity combiner for selecting therein from among a plurality of diversity signal channels that with a signal having a predetermined reference condition differing by more than a predetermined amount from the similar reference conditions of the other channel signals, said method comprising the steps of deriving reference signals representing the respective values of said channel signal reference conditions, selecting one such channel while selecting the reference signal of the selected channel and recurringly comparing said reference signal with the respective reference signals of remaining channels in successive order, and changing the selection to a different channel and its reference signal responsive to attainment by the latter of a predetermined differential with relation to the reference signal of the channel previously selected.

7. A multichannel diversity receiver system comprising a common demodulator, a plurality of substantially similar receiver units each having an input, an output adapted to be connected to a utilization apparatus in common with other such receiver units, conversion means subject to signals from the receiver unit input for deriving therefrom a reference signal related to the value of a predetermined reference condition of said signal, signal transfer means interposed in the connection of the receiver unit and the utilization apparatus and operable to open and close said connection, and means to actuate said signal transfer means comprising a differential comparator having a first input connected to the conversion means, a second input adapted to be energized by the reference signal from any other unit, and an output actuatingly connected to said signal transfer means for closing the connection thereof in response to a predetermined differential between the signals at the two inputs of said comparator, reference signal transfer means having an input connected to the conversion means and an output adapted to be connected by actuation of said reference signal transfer means to the second input of other receiver unit comparators, sampling switch means connected between the output of other receiver unit reference transfer switch means and the second input of said differential comparator, means to actuate said reference transfer means with actuation of said signal transfer means, comprising a connection to said reference transfer means from the differential comparator, and means forming deactuation connections from the differential comparator to the reference transfer means and signal transfer means to the like connections of other receiver units for maintaining the reference transfer means and signal transfer means of the units deactuated subject to selective actuation thereof in any such unit by the comparator output thereof.

8. A multichannel diversity system comprising a common utilization apparatus, a signal bus connected to said utilization apparatus, a reference bus, a transfer deactuation bus, a plurality of substantially similar channel units each having an input, an output adapted to be connected to said signal bus, conversion means subject to signals from the unit input for deriving therefrom a reference signal related to the value of a predetermined reference condition of said signal, signal transfer means interposed in the connection of the unit and the signal bus and operable to open and close said connection, and means to actuate said signal transfer means comprising a differential comparator having a first input connected to the conversion means, a second input adapted to be periodically energized by the reference signal from any other unit, and an output actuatingly connected to said signal transfer means for closing the connection thereof in response to a predetermined differential between the signals at the two inputs of said comparator, means including a sampling switch connected between said reference bus and the second input of said comparator for periodically connecting said reference bus thereto, reference signal transfer means having an input connected to the conversion means and an output connected to the reference bus to apply the reference signal thereto by actuation of said reference signal transfer means, means to actuate said reference transfer means with actuation of said signal transfer means, comprising a connection to said reference transfer means from the differential comparator, and means including said transfer deactuation bus forming deactuation connections from the differential comparator to the reference transfer means and signal transfer means for maintaining the reference transfer means and signal transfer means of the units deactuated subject to selective actuation thereof in any such unit by the comparator output thereof.

References Cited by the Examiner

UNITED STATES PATENTS 1,747,236   2/30   Gillett _____ 325—304
2,775,693   12/56   Berwin _____ 328—137

DAVID G. REDINBAUGH, *Primary Examiner.*